United States Patent
Shumiya et al.

(10) Patent No.: US 10,306,105 B2
(45) Date of Patent: May 28, 2019

(54) IMAGE SCANNER AND LINE PERIOD DETERMINING METHOD FOR IMAGE SCANNER

(71) Applicant: BROTHER KOGYO KABUSHIKI KAISHA, Nagoya, Aichi (JP)

(72) Inventors: Kazushi Shumiya, Konan (JP); Jie Zheng, Aichi (JP); Masashi Fujimoto, Kyoto (JP); Takahiro Ikeno, Seto (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 23 days.

(21) Appl. No.: 15/796,893

(22) Filed: Oct. 30, 2017

(65) Prior Publication Data

US 2018/0139352 A1    May 17, 2018

(30) Foreign Application Priority Data

Nov. 14, 2016    (JP) .................................. 2016-221664

(51) Int. Cl.
| | | |
|---|---|---|
| *H04N 1/04* | (2006.01) | |
| *H04N 1/40* | (2006.01) | |
| *H04N 1/401* | (2006.01) | |

(52) U.S. Cl.
CPC .......... *H04N 1/4005* (2013.01); *H04N 1/401* (2013.01); *H04N 1/40056* (2013.01); *H04N 2201/0081* (2013.01)

(58) Field of Classification Search
CPC .. H04N 1/4005; H04N 1/40056; H04N 1/401; H04N 2201/0081
USPC ............................... 358/445, 446; 250/208.1
See application file for complete search history.

(56) References Cited

U.S. PATENT DOCUMENTS

| | | | | |
|---|---|---|---|---|
| 5,221,976 A | * | 6/1993 | Dash ..................... | G06T 3/4023 358/451 |
| 5,587,772 A | * | 12/1996 | Arai ..................... | H04N 1/4056 358/3.21 |
| 2004/0013321 A1 | | 1/2004 | Ohkawa | |

FOREIGN PATENT DOCUMENTS

| | | |
|---|---|---|
| JP | 2000224392 A | 8/2000 |
| JP | 2001045245 A | 2/2001 |
| JP | 2002281252 A | 9/2002 |
| JP | 2003008845 A | 1/2003 |
| JP | 3631637 B2 | 3/2005 |

* cited by examiner

*Primary Examiner* — Cheukfan Lee
(74) *Attorney, Agent, or Firm* — Scully, Scott, Murphy & Presser, PC

(57) ABSTRACT

An image scanner has an operation clock generator, a photoelectric converter, an AD converter configured to convert the analog pixel signals serially output by the photoelectric converter to digital pixel data by sampling the analog pixel signals in accordance with an operation clock generated by the operation clock generator, a data generator configured to generate read image data representing an read image of the original based on the pixel data converted by the AD converter, a resolution setter configured to set a reading resolution in the sub scanning direction, and a line period determiner configured to determine the line period to be (integer+decimal value) times a modulation period based on the reading resolution set by the resolution setter, the modulation period being inversion of the modulation frequency. The integer is greater than one and the decimal value is determined based on the reading resolution.

10 Claims, 11 Drawing Sheets

| | RESOLUTION [DPI] | | LINE PERIOD [ms] | THE NUMBER OF PIXEL CLOCKS FOR 1 LINE [CLK] | PIXEL PERIOD [CLK] | ADJUSTMENT AMOUNT [ns] | THE NUMBER OF CLOCKS PER PIXEL [CLK] | PIXEL FREQUENCY [MHz] | RATIO WITH RESPECT TO MODULATION PERIOD |
|---|---|---|---|---|---|---|---|---|---|
| | MAIN SCANNING | AUXILIARY SCANNING | | | | | | | |
| 1 | 300 | 300 | 0.29746 | 974 | 24 | 102 | 13 | 9.82 | 9.37008 |
| | 600 | 600 | 0.55278 | 1810 | 0 | 102 | 13 | 9.82 | 17.41257 |
| | 1200 | 1200 | 1.08479 | 3552 | 22 | 102 | 13 | 9.82 | 34.17096 |
| 2 | 300 | 300 | 0.26782 | 950 | 0 | 94 | 12 | 10.64 | 8.43618 |
| | 600 | 600 | 0.51731 | 1835 | 25 | 94 | 12 | 10.64 | 16.29514 |
| | 1200 | 1200 | 0.99514 | 3530 | 0 | 94 | 12 | 10.64 | 31.34706 |
| 3 | 300 | 300 | 0.32922 | 1001 | 51 | 110 | 14 | 9.12 | 10.37058 |
| | 600 | 600 | 0.61240 | 1862 | 52 | 110 | 14 | 9.12 | 19.29073 |
| | 1200 | 1200 | 1.16100 | 3530 | 0 | 110 | 14 | 9.12 | 36.57157 |

FIG. 14

IMAGE SCANNER AND LINE PERIOD DETERMINING METHOD FOR IMAGE SCANNER

CROSS-REFERENCE TO RELATED APPLICATIONS

This application claims priority under 35 U.S.C. § 119 from Japanese Patent Application No. 2016-221664 filed on Nov. 14, 2016. The entire subject matter of the application is incorporated herein by reference.

BACKGROUND

Technical Field

The present disclosures relate to an image scanner and a line period determining method for an image scanner.

Related Art

Conventionally, a line sequential type image scanner configured to read an original image on a line basis has been known. The line sequential type image scanner typically emits light toward an original with changing a positional relationship relative to the original, and receives the reflected light from the original with a line sensor to read the original image on a line basis. Examples of such an image scanner include a flat-bed type scanner and an ADF type scanner.

The line sensor employed in such an image scanner to read the original image is an image sensor provided with a plurality of photodetectors arranged in a main scanning direction, which is an extending direction of the line sensor. In the image scanner, in order to realize a reading operation of each line, a line period is determined. That is, the image sensor is configured to execute a light receiving operation at every line period, and serially outputs analog pixel signals corresponding to light receiving amounts of respective photodetector. Typically, in such an image scanner, an AD convertor is provided to sample the analog pixel signals serially output by the image sensor at a sampling period in accordance with an operation clock, thereby converting the same to digital pixel data.

It is also known an image scanner implemented with a spread spectrum clock generator (SSCG) as a countermeasure against electromagnetic interference. According such an image scanner, the SSCG applies a frequency modulation to a reference clock to generate spread spectrum clock (SSC). The SSC is provided to the image sensor and the AD converter as operation clocks. The image sensor outputs analog pixel signals according to a period based on the operation clock. The AD converter samples the analog pixel signals in accordance with the period based on the operation clock.

SUMMARY

In the image scanner using the SSC as mentioned above, since the operation clock based on the SSC is provided to a sample-hold circuit of the AD converter, a sampling timing varies. As a result, when the analog pixel signals lack flatness, a group of digital pixel data, which is an output of the AD converter exhibits a periodical noise component caused by the frequency modulation as influenced by transient phenomenon inside the circuit.

In order to reduce the influence of deterioration of image quality represented by the read image data due to the periodical noise, there has been known a technique to set the line period to a sum of an integer multiple of the spread spectrum period and half the period. According to the technique, since the phase of the periodical noise component of the adjacent line is inversed, to human eyes, the inversed phase components serve to cancel the noise components between adjacent lines. As a result, it becomes possible to make unevenness of the read image due to the spread spectrum clock.

Recently, image scanners configured to switch the reading resolutions have been widely spread. In such image scanners, when the original is read in a high resolution mode, the number of pixels in the main scanning direction and the number of lines in a sub scanning direction are too many, thereby a time period necessary to read the image becoming long.

Generally, the reading resolution at which each line of an image is discriminable for human eyes is known to be approximately 300 dpi. When read at a higher resolution, the image is discriminated at every multiple lines but not each line by human yes.

As above, a visual sense limit regarding the reading resolution is approximately 300 dpi. According to a conventional art described above, in order to reduce the influence on image quality deterioration due to the periodical noise components, the line period is set to the integer multiple of the spread spectrum period plus half the period, regardless of the reading resolution.

The present inventors have found that, setting of the line period without taking the visual sense limit of human eyes results in setting of an unnecessarily long line period in reading an image at the high resolution.

Therefore, according to aspects of the present disclosures, there may be provided a technique in which influence on the image quality by the periodical noise components due to the modulation in the image read scanner configured to operate based on the operation clock which is frequency-modulated is effectively suppressed.

According to aspects of the disclosures, there is provided an image scanner, which has an operation clock generator configured to generate an operation clock by frequency modulating a reference clock with a particular modulation frequency, a photoelectric converter having a plurality of photodetectors arranged in a main scanning direction, the plurality of photodetectors receiving reflected light, the reflected light being reflected by an original and is displaced in a sub scanning direction, the sub scanning direction being perpendicular to the main scanning direction, at every line period, the plurality of photodetectors serially outputting analog pixel signals corresponding to received light amounts of the plurality of photodetectors, respectively, in accordance with the operation clock, an AD converter configured to convert the analog pixel signals serially output by the photoelectric converter to digital pixel data by sampling the analog pixel signals in accordance with the operation clock, a data generator configured to generate read image data representing an read image of the original based on the pixel data converted by the AD converter, a resolution setter configured to set a reading resolution in the sub scanning direction, and a line period determiner configured to determine the line period to be (integer+decimal value) times a modulation period, the modulation period being inversion of the modulation frequency based on the reading resolution set by the resolution setter. The integer is greater than one and the decimal value is determined based on the reading resolution.

According to aspects of the disclosures, there is also provided a line period determining method for an image scanner having an operation clock generator configured to generate an operation clock by frequency modulating a reference clock with a particular modulation frequency, a photoelectric converter having a plurality of photodetectors arranged in a main scanning direction, the plurality of photodetectors receiving reflected light, the reflected light being reflected by an original and is displaced in a sub scanning direction perpendicular to the main scanning direction, at every line period, the plurality of photodetectors serially outputting analog pixel signals corresponding to received light amounts of the plurality of photodetectors, respectively, in accordance with the operation clock, an AD converter configured to convert the analog pixel signals serially output by the photoelectric converter to digital pixel data by sampling the analog pixel signals in accordance with the operation clock, read image data representing an read image of the original being generated based on the pixel data converted by the AD converter. The method includes determining a line period which is (integer +decimal value) times a modulation period that is inversion of the modulation frequency for each of reading resolutions settable in the image scanner, the integer being greater than one, and identifying, for each of settable reading resolutions, at least one decimal value with making cross-point values less than a threshold value, the cross-point values being amounts of the fluctuation component at cross-points of the fluctuation components of the visual sense limit resolution equivalent first adjacent line and the visual sense limit resolution equivalent second adjacent line superimposed such that coordinate axes thereof in the main scanning direction are coincident with each other, are less than a threshold value. The determining step includes setting, for each of the settable reading resolutions, the line period corresponding to the reading resolution to (integer+decimal value) times the modulation period determined based on the identified decimal value.

BRIEF DESCRIPTION OF ACCOMPANYING DRAWINGS

FIG. 1 schematically shows a configuration of an image scanner according to an illustrative embodiment of the disclosures.

FIG. 2 is a block diagram showing a detailed configuration of the image scanner shown in FIG. 1.

FIG. 3 schematically shows a configuration of a line sensor of the image scanner.

FIG. 14 is a table showing a relationship between line periods and adjustment values.

DETAILED DESCRIPTION OF THE ILLUSTRATIVE EMBODIMENT

Hereinafter, referring to the accompanying drawings, an illustrative embodiment according to the disclosures will be described. An image scanner 1 according to the illustrative embodiment is configured as a flatbed type scanner or an ADF type scanner. That is, the image scanner 1 is configured such that a relative position, in a sub scanning direction, between a line sensor 10 and the original Q is changed by moving a line sensor 10 or an original Q in the sub scanning direction, while by reading the original on a line basis in a main scanning direction with use of the line sensor 10, an entire two-dimensional image of the original Q is read. Image data of the original Q generated by the reading operation is transmitted to an external device such as a personal computer. When the image scanner 1 is configured as a part of a digital MFP, the read image data of the original Q may be used inside the digital MFP to make copies of the image of the original Q.

Figure 1:
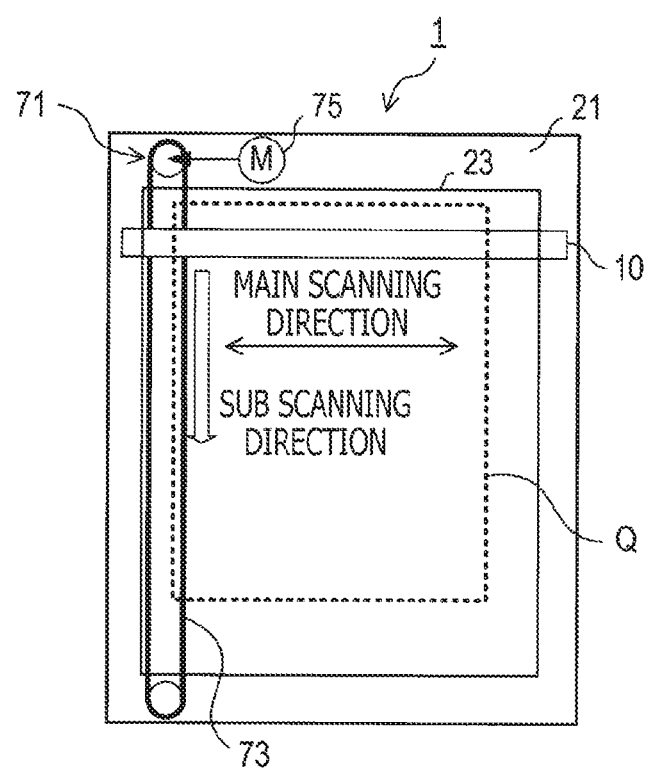

FIG. 1 schematically shows a configuration of a flatbed type image scanner 1 according to an illustrative embodiment of the present disclosures. The image scanner 1 is configured such that an original Q is placed on a transparent platen glass 23 provided to an original mounting table 21. Below the original mounting table 21, a line sensor 10 which is formed to be elongated in the main scanning direction, is movably arranged so as to move in the sub scanning direction which is perpendicular to the main scanning direction. It is noted that, in FIG. 1, a structure below the original mounting table 21 is indicated as if it is visible through the original mounting table 21. The line sensor 10 operates to optically read the original Q, which faces the line sensor 10 through the platen glass 23, on a line basis with moving in the sub scanning direction.

Figure 2:
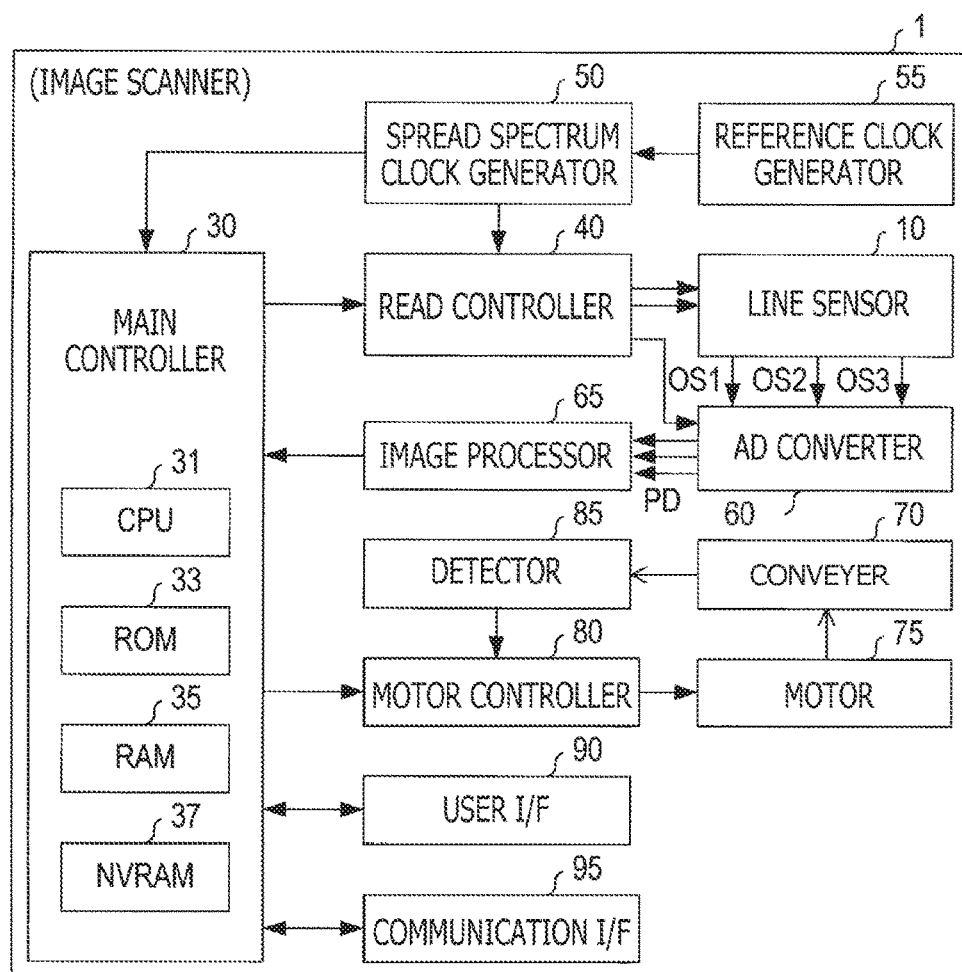

The image scanner 1 according to the illustrative embodiment is configured as shown in FIG. 2. That is, the image scanner 1 includes, in addition to the line sensor 10, a main controller 30, a read controller 40, a spread spectrum clock generator (SSCG) 50, a reference clock generator 55, an AD converter 60, an image processor 66, a conveyer 70, a motor 75, a motor controller 80, a detector 85, a user I/F 90 and a communication I/F 95.

The main controller 30 is configured to integrally control the image scanner 1 entirely. The main controller 30 has a CPU 31, a ROM 33, a RAM 35 and an NVRAM 37. The CPU 31 executes processes in accordance with programs stored in the ROM 33. The RAM 35 is used as a work area when the CPU 31 executes the processes. The NVRAM 37 is an electrically rewritable non-volatile memory and is configured to store various pieces of data. The NVRAM 37 may be configured by a flash memory or an EEPROM. As the CPU 31 executes various processes in accordance with the programs stored in the ROM 33, various functions of the image scanner 1 are realized.

The read controller 40 inputs, under control of the main controller 30, various signals to the line sensor 10 to cause the line sensor 10 to execute a reading operation of the original Q. The signals transmitted from the read controller 40 include a line start signal and a pixel clock signal. The read controller 40 operates in accordance with a spectrum-spread clock signal (hereinafter, referred to as an SSCG clock) transmitted from the SSCG 50, and inputs the line start signal and the pixel clock signal to the line sensor 10. Further, the read controller 40 inputs an AD clock signal, which is an operation clock for the AD converter 60 and generated based on the SSCG clock, to the AD converter 60. The read controller 40 generates the pixel clock signals by dividing the SSCG clock. It is noted that the AD clock signal may be a signal which is generated by dividing the SSCG clock at the same division ratio to generate the pixel clock signal.

The SSCG 50 generates the SSCG clock by frequency modulating the reference clock received from the reference clock generator 55 in accordance with a spread spectrum method, and inputs the generated SSCG clock to various portions in the image scanner 1. For example, the SSCG 50 can generate the SSCG clock by frequency modulating the reference clock using a particular modulation frequency so that the frequency of the reference clock is changed in accordance with a wave like a triangular wave or a sign wave oscillating about a center frequency.

The line sensor 10 is a CIS (contact image sensor), which is configured to emit light to the original Q subjected to be read, receive reflected light from the original Q, and outputs analog pixel signals PS corresponding to light amounts received by respective pixels serially in accordance with a pixel clock signal.

Figure 3:
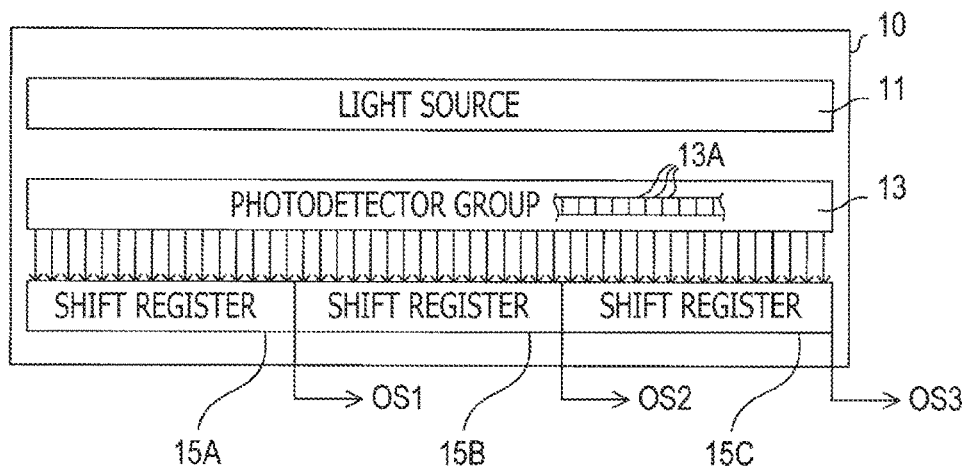
Figure 4:
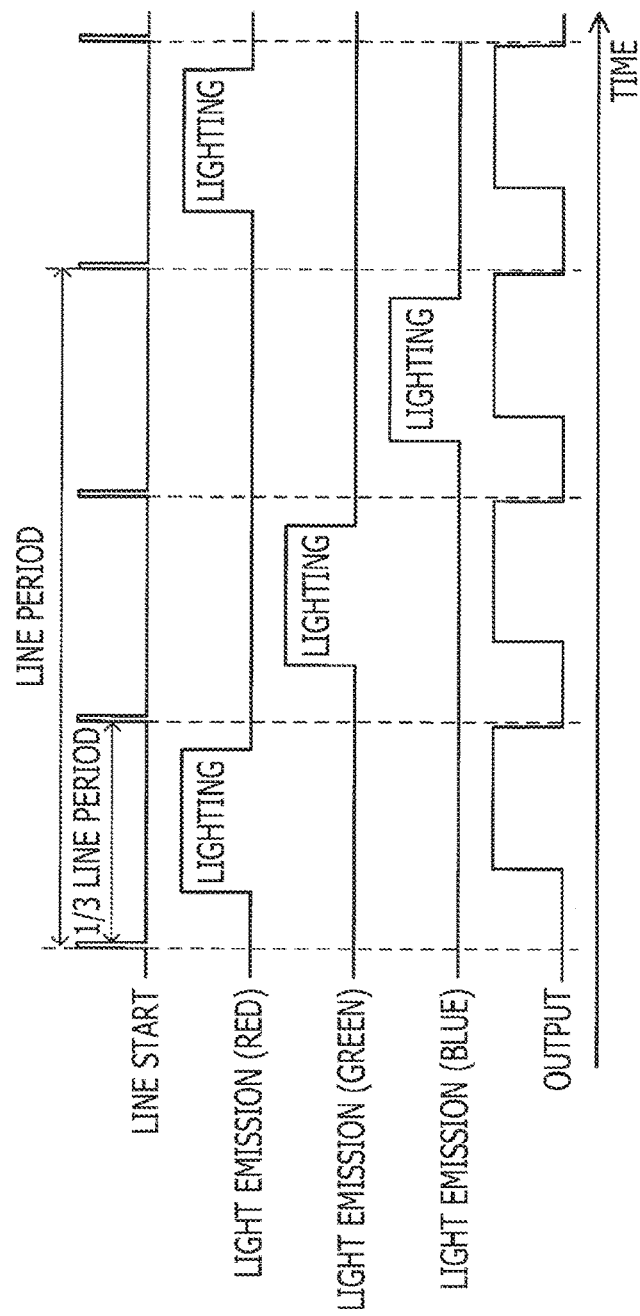
FIGS. 4A-4E show a time chart of a line start signal and output signal.
Figure 5:
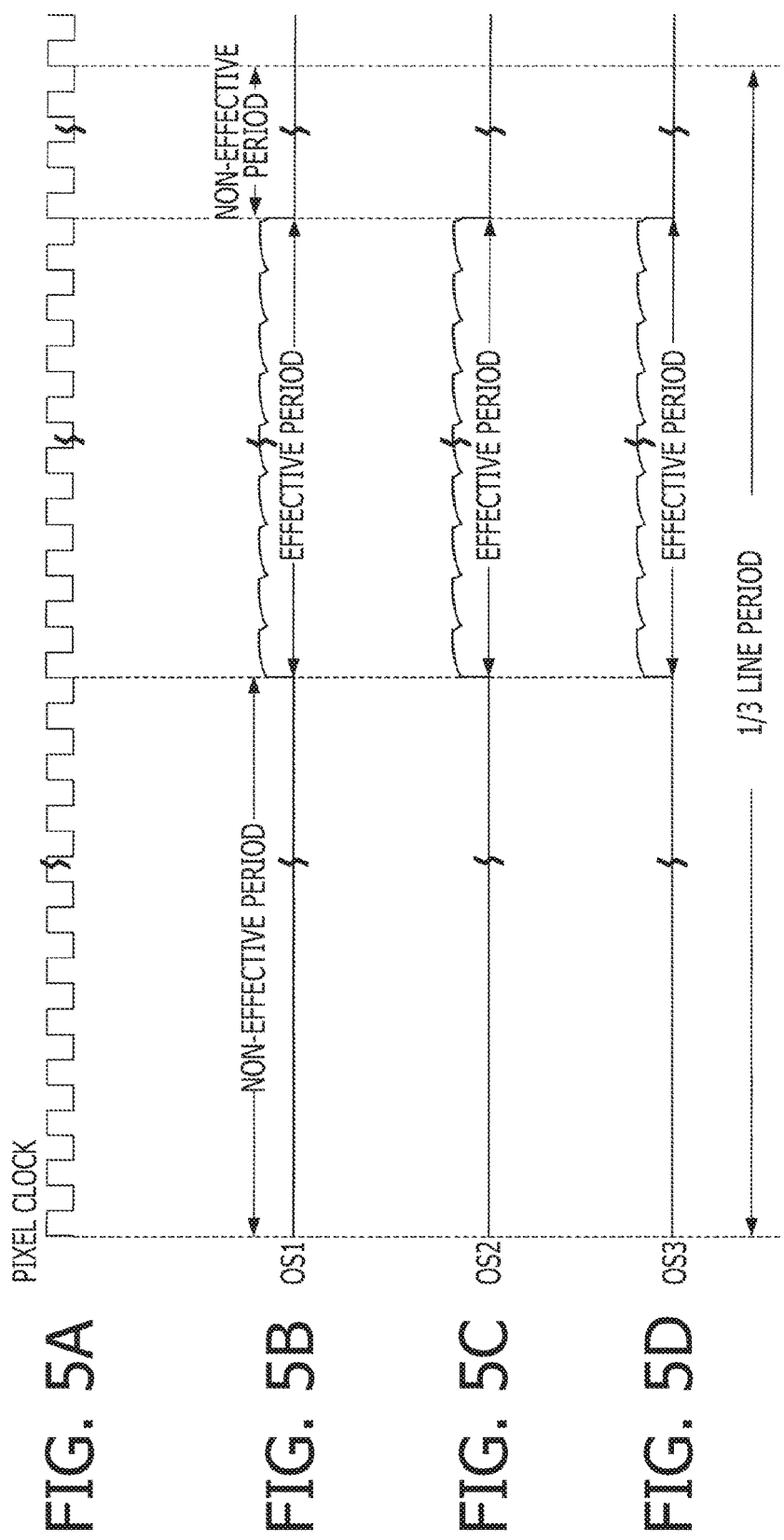
FIGS. 5A-5D show a time chart of a non-effective period and an effective period within a ⅓ line period.

The line sensor 10 has, as shown in FIG. 3, a light source 11, a photodetector group 13 including a plurality of photodetectors 13A arranged in the main scanning direction, and a plurality of shift registers 15A, 15B and 15C configured to receive signal charges from the respective photodetectors 13A.

The light source 11 includes a red light source, a green light source and a blue light source, which can be lit/extinguished separately and individually. The light source 11 operates, in accordance with a line start signal, to repeat lighting/extinction of the red light, green light and blue light as shown in Fig. FIGS. 4A-4E. The line start signal is turned ON for a constant time period at every ⅓ period. The line period corresponds a time period during which the relative position between the line sensor 10 and the original Q by one line in the sub scanning direction. The light source 11 is configured to switch the color light sources sequentially at every ⅓ line period so that each color light source is turned ON for a particular time period.

The photodetector 13A is an element which generates charges corresponding to the received light amount in accordance with photoelectric conversion. The photodetector 13A is configured by, for example, a photodiode. The photodetector group 13 transfers charges corresponding to the received light amount to the shift registers 15A, 15B and 15C, in accordance with the line start signal, at every ⅓ line period, and reset self-holding charges to zero. By the reset, the photodetector group 13 newly starts the light receiving operation. That is, the photodetector group 13 reads the original Q for respective colors and lines, in the light receiving operation at every ⅓ line period, thereby reading the original Q as RGB color images.

Each of the shift registers 15A, 15B and 15C is configured to receive the charges from the photodetectors 13A within a section, which is one of a plurality of sections divided in the main scanning direction, at every ⅓ line period, and serially output the analog pixel signal PS of each pixel indicative of a voltage corresponding to the received charges. According to the illustrative embodiment, an entire length, in the main scanning direction, of the photodetector group 13 is divided into three sections, and the three shift registers 15A, 15B and 15C correspond to the three sections, respectively.

In FIG. 3, the output signal from the first shift register 15A is indicated by OS1, the output signal from the second shift register 15B is indicated by OS2, and the output signal from the third shift register 15C is indicated by OS3. The output signals OS1, OS2 and OS3 are, as shown in FIGS. 5A-5D, output in parallel at every ⅓ line period, and input to the AD converter 60 (see FIG. 2).

As shown in FIGS. 5A-5D, each of the output signals OS1, OS2 and OS3 has an effective period, and a non-effective period. The effective period is a period, within the ⅓ line period, during which the analog pixel signal PS subjected to the AD conversion is output, and the non-effective period is a period during which signals which are not effective as signals subjected to the AD conversion may be output. In the example shown in FIGS. 5A-5D, the non-effective periods exist both before and after the effective period. However, the non-effective period after the effective period may not exist. It is noted that the non-effective period before the effective period is a period necessary for transferring the charges from the photodetector group 13 to the shift registers 15A, 15B and 15C.

Further, according to the line sensor 10, the original Q can be read at different reading resolution in the main scanning direction. For example, the line sensor 10 is configured to read the original Q with switching the reading resolution in the main scanning direction among 300 dpi, 600 dpi and 1200 dpi. The line sensor 10 is configured such that the photodetectors 13A are arranged in the main scanning direction at an interval corresponding to the maximum reading resolution of 1200 dpi. When the original Q is read at the reading resolution of 1200 dpi, the line sensor 10 outputs the analog pixel signals PS corresponding to the signal charges generated by respective photodetectors 13A such that each of photodetectors 13A corresponds to one pixel, as shown in an upper portion of FIG. 6.

Figure 6:
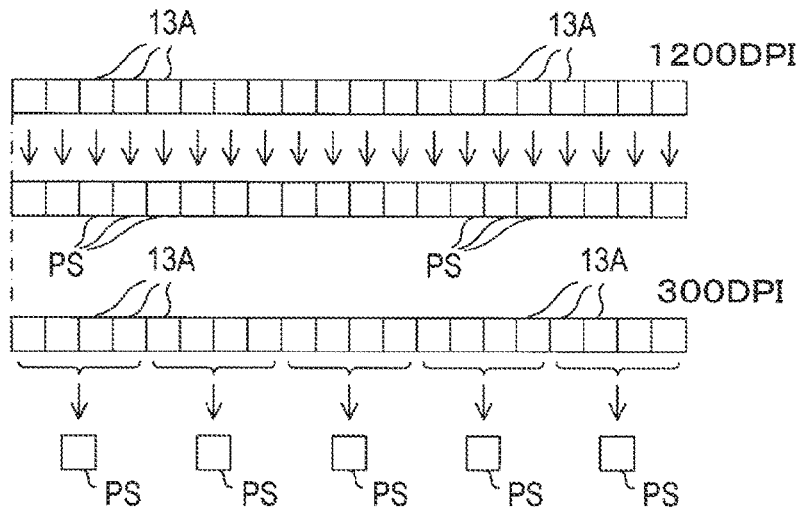
FIG. 6 illustrates reading operations when reading resolutions are 300 dpi and 1200 dpi, respectively.

When the original is read at the resolution of 300 dpi, as shown in the lower portion of FIG. 6, the four photodetectors 13A are regarded to correspond to one pixel, and the sum of the signal charges of every four photodetectors 18A is output as the analog pixel signal PS of each pixel.

The AD converter 60 converts the analog pixel signals PS corresponding to the respective pixels to pixel data PD which is a digital pixel signal, by sampling the output signals OS1, OS2 and OS3, which are analog pixel signals PS for respective pixels output by the line sensor 10, at timings according to the AD clock signal. The AD converter 60 is configured to convert, for example, the analog pixel signals PS to 8-bit (i.e., 256-gradation) pixel data PD.

Specifically, the AD converter 60 has channels of which number is equal to or greater than the number of shift registers 15A, 15B and 15C, and converts, in parallel, the analog pixel signals PS included in the effective periods in the output signals OS1, OS2 and OS3 transmitted from the respective shift registers 15A, 15B and 15C into pixel data PD.

The pixel data PD corresponding to the output signals OS1, OS2 and OS3 is input to the image processor 65 in parallel, as shown in FIG. 2, and by the function of the image processor 65, aligned in the main scanning direction corresponding to the arrangement of the pixels.

The image processor 65 applies image processing operations such as a gamma correction, a shading correction and the like to a group of the pixel data PD received from the AD converter 60, and stores the same in the RAM 35. As a result, in the RAM 35, the read image data of the original Q is generated. The read image data of the original Q is color read image data.

The conveyer 70 is a mechanism configured to move the original Q or the line sensor 10 in the sub scanning direction in order change the relative position between the original Q and the line sensor 10 in the sub scanning direction. The conveyer 70 is driven to operate by the motor 75. When the image scanner 1 is the flatbed type scanner, the conveyer 70 moves the line sensor 10 in the sub scanning direction with, for example, a belt mechanism 71 shown in FIG. 1. According to the example shown in FIG. 1, the line sensor 10 is connected to an endless belt 73 provided to the belt mechanism 71, and moves in the sub scanning direction in association with movement of the endless belt 73 with being guided by a guide member (not shown). When the image scanner 1 is the ADF type scanner, the conveyer 70 may be configured to have a roller (not shown) that rotates by the driving force transmitted from the motor 75 so as to convey the original Q in the sub scanning direction.

The motor controller 80 controls movement of the object (e.g., the line sensor 10) subjected to be conveyed by the conveyer 70 by feedback controlling rotation of the motor 75 which drives the conveyer 70 based on position information and the speed information transmitted from the detector 85. The detector 85 may be provided with an encoder (not shown) secured to a rotational shaft of the motor 75, and a signal processing circuit (not shown) configured to convert the input signal transmitted from the encoder to the position information and speed information.

The user I/F 90 is configured to acquire user operations and display information for the user. For example, the user I/F 90 may have a liquid crystal display and a touch panel overlaid on the liquid crystal display. Operation signals representing the user operations are transmitted to the main controller 30 through the user I/F 90. The user I/F 90 may be, for example, controller by the main controller 30 to display various pieces of information on a display for the user to view.

The communication I/F 95 is configured to communicate with external equipment. For example, the communication I/F 95 transmits instructions received from the external equipment to the main controller 30, and transmits the read image data received from the main controller 30 to the external equipment. The communication I/F 95 includes a LAN interface and/or a USB interface as a concrete example.

Figure 7:
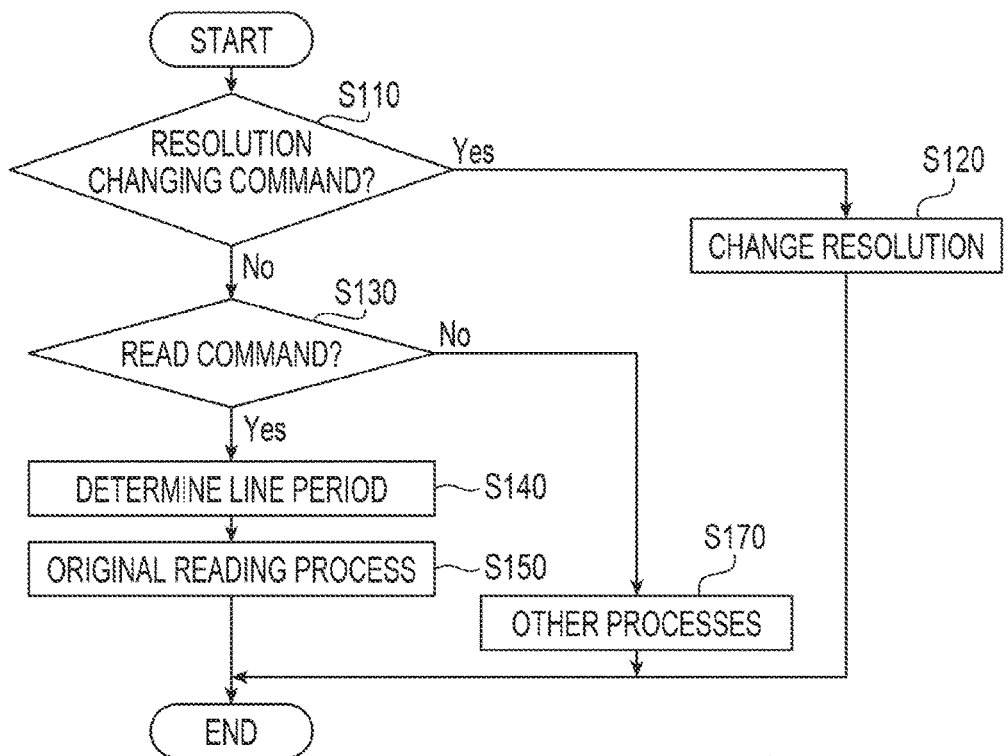
FIG. 7 is flowchart illustrating a process executed by a main controller of the image scanner.

When a command is input from the external equipment or through the user I/F 90, the main controller 30 executes a process corresponding to the input command. Specifically, when the command is input, the main controller 30 executes a command reception process shown in FIG. 7.

When the command reception process is started, the main controller 30 determines whether the input command is a resolution changing command (S110). When it is determined that the input command is the resolution changing command (S110: YES), the main controller 30 sets the reading resolution of the original Q to the reading resolution as designated in accordance with the resolution changing command (S120). It is noted that the reading resolution settable in accordance with the command is 300×300 dpi, 600×600 dpi and 1200×1200 dpi. The expression α×β dpi indicates that the reading resolution in the main scanning direction is α dpi, while the reading resolution in the sub scanning direction is β dpi. Thereafter, the main controller 30 terminates the command reception process.

When it is determined that the input command is not the resolution changing command (S110: NO), the main controller 30 determines whether the input command is the read command (S130). When it is determined that the input command is the read command (S130: YES), the main controller sets the line period to the period corresponding to the currently set reading resolution (S140).

The ROM 33 stores a table defining line periods for respective settable reading resolutions. The main controller 30 sets the line period to the period corresponding to the currently set reading resolution, referring to the table (S140).

Thereafter, the main controller 30 executes an original reading process (S150). In the original reading process, the main controller 30 set control parameters to the read controller 40 and the motor controller 80, and causes the read controller 40 and the motor controller 80 to execute operations in accordance with the control parameters. With this control, the main controller 30 controls the reading operation of the line sensor 10 and the conveying operation of the line sensor 10 or the original Q, via the read controller 40 and the motor controller 80, thereby realizing the reading operation of the original Q.

Specifically, the read controller 40 generates the line start signal, the pixel clock signal and the AD clock signal in accordance with the control parameters, and causes the line sensor 10 to execute the reading operation according to the currently set reading resolution in the main scanning direction at a line period in accordance with the currently set reading resolution in the sub scanning direction.

The AD converter 60 samples the analog pixel signals PS for respective pixels serially input at the timing according to the AD clock signal, and converts the same to the digital pixel data PD, thereby generating the pixel data PD for respective pixels. The image processor 65 generates the read image data of the original Q based on the pixel data PD and stores the same in the RAM 35. The motor controller 80 controls the motor 75 such that the relative position between the line sensor 10 and the original Q changes in the sub scanning direction by one line corresponding to the reading resolution in the sub scanning direction at every one line period.

By controlling the motor 75 and the line sensor 10 as described above, the reading operation of the original Q according to a particular reading resolution can be realized. The read image data generated in the original reading process is provided to the external equipment through, for example, the communication I/F 95. Optionally, or alternatively, the read image data may be stored in the NVRAM 37. The main controller 30 terminates the command reception process after execution of the original reading process (S150). When it is determined that the input command is not the resolution changing command or the read command (S130: NO), the main controller 30 advances the process to S170, executes another process corresponding to the input command, and then terminates the command reception process.

Next, a technique of suppressing deterioration of image quality due to the fluctuation component which is generated during the reading operation and the AD converting operation based on the pixel clock signal and the AD clock signal will be described.

According to the reading operation and the AD converting operation based on the clock signal which is frequency modulated in accordance with the spread spectrum method, the fluctuation component corresponding to the modulation period may exhibit as mentioned above. The modulation period corresponds to an inverse of the modulation frequency in the SSCG 50. According to the conventional art, in order to suppress deterioration of the image quality due to such a fluctuation component, the line period is set to be (integer multiple+0.5) times the modulation period so that the fluctuation components of adjacent lines in the auxiliary direction have inversed phases. That is, the line period is set to be the integer multiple of the modulation period plus half the modulation period.

However, adjustment of the line period as described above requires a line period which is longer than it has to be. It should be noted that the adjustment of the line period may be sufficient if it is done so that deterioration of the image quality is not recognized by the user. It is generally known that the visual sense limit of human being is approximately 300 dpi. That is, regarding an image of which resolution is higher than 300 dpi, the user may not recognize each pixel individually, but each pixel is recognized together with surrounding pixels. That is, regarding the image of which resolution is higher than 300 dpi (e.g., 600 dpi or 1200 dpi), evaluation of the image quality on a pixel basis could be regarded to be superfluous evaluation without considering the visual sense limit of the human eyes.

The inventors have noticed that setting of the line period unitarily to (integer multiple+0.5) times the modulation period regardless of the reading resolution may result in redundancy in setting the line period.

When the reading resolution in the sub scanning direction is 300 dpi, in order to suppress deterioration of the image quality, it is sufficient to set the line period such that a cross-point value of fluctuation components of two adjacent lines (i.e., a first adjacent line and a second adjacent line) when superimposed with their coordinates in the main scanning direction being coincident is less than a threshold value TH corresponding to the visual sense limit of human eyes.

Superimposition of the fluctuation components of both the first adjacent line and the second adjacent line with their coordinates in the main scanning direction being coincident may be done, for example, as follows. A coordinate system having an X-axis representing a positional coordinate in the main scanning direction and a Z-axis representing a value of the fluctuation component is defined, and both the fluctuation components of the first adjacent line and the second adjacent line are arranged on the coordinate system. By this superimposition, the fluctuation components corresponding to the pixels, located at the same position in the main scanning direction, of the first adjacent line and the second adjacent line have the same X coordinate corresponding to that of the pixels in the coordinate system.

The fluctuation component in the above description is defined as a fluctuation component, which is caused due to frequency modulation, extracted from a serial signal obtained by serially connecting the analog pixel signals PS of the pixels of a single line in the main scanning direction. The cross-point value is a value Z of the fluctuation components at each cross-point of two fluctuation components which are superimposed with their coordinate axes in the main scanning direction being coincident with each other.

Figure 8:
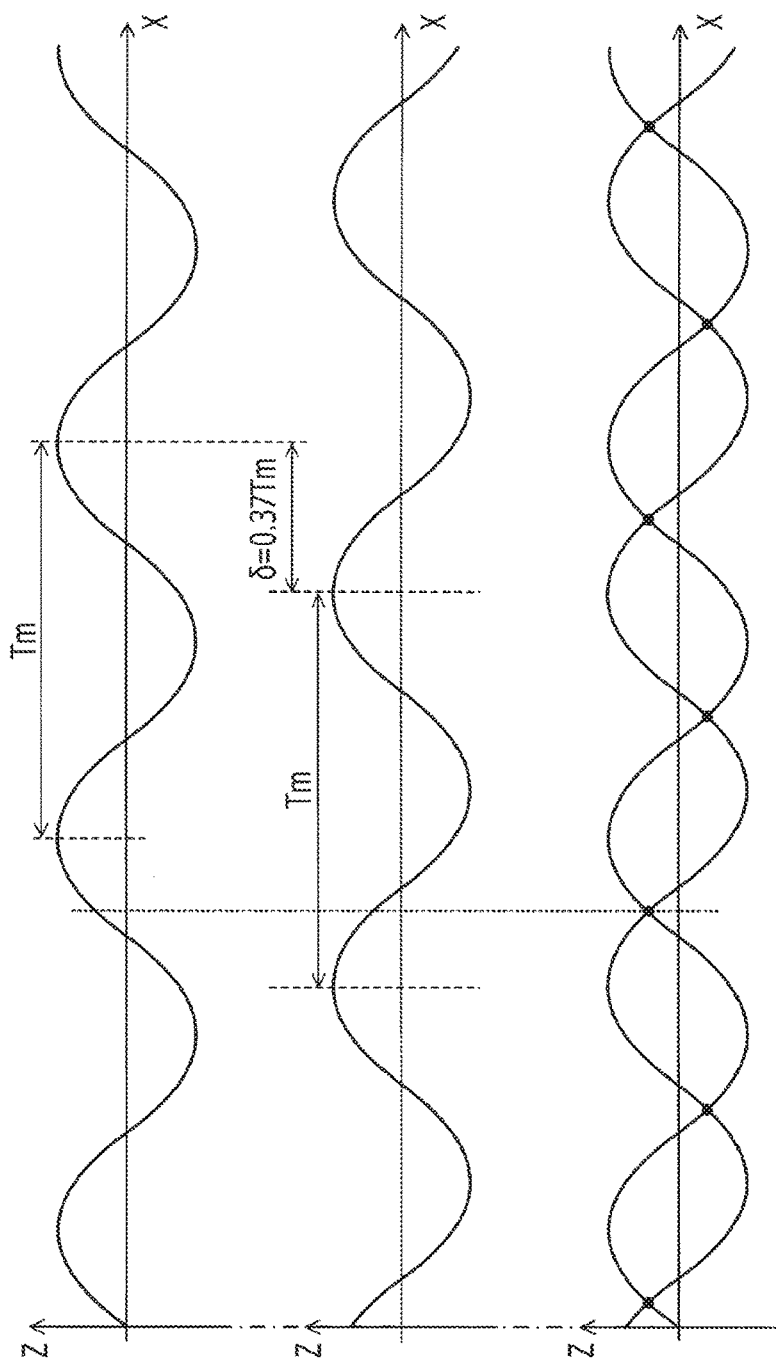
FIGS. 8A-8C show cross points and cross-point values based on superimposing fluctuation components of adjacent lines.

The wave forms shown in FIG. 8C are superposition of the wave form of the fluctuation component of the first adjacent line (see FIG. 8A) and the wave form of the fluctuation component of the second adjacent line (see FIG. 8B), with the coordinate axis extending in the main scanning direction being coincident. The horizontal axis shown in each of FIGS. 8A-8C indicates the positional coordinate in the main scanning direction, while the vertical axis shown in each of FIGS. 8A-8C indicates the value Z of the fluctuation component. That is, the value Z at the positional coordinate X indicates the quantity of the fluctuation component included in the analog pixel signal PS of the pixel corresponding to the positional coordinate X.

In FIG. 8C, the cross-points of the fluctuation component of the first adjacent line and the fluctuation component of the second adjacent line are indicated by black circles. The values Z at the X coordinates corresponding to the black circles are the cross-point values, respectively. The cross-point values have either positive or negative values. It is noted that the cross-point values to be compared with the threshold value TH are considered to be their absolute values (or the positive values).

According to the example shown in FIGS. 8A-8C, the line period is set to (N+0.37)×Tm, where Tm is a modulation period, and N is a positive integer greater than zero. Generally, the integer N is much greater than one. Therefore, the phase of the fluctuation component of the second adjacent line is shifted with respect to the first adjacent line by (0.37×2π).

Such cross points of the adjacent lines corresponds to the most conspicuous positions of the fluctuation component in the user's visual sense as the fluctuation components of the adjacent lines emphasize each other. This can also be understood since at portions between adjacent cross-points, the fluctuation components of the adjacent lines cancel each other.

The threshold value TH may be determined as the cross-point value corresponding to one step of gradations and the read image is represented by 256 gradations (i.e., 8 bits). That is, the threshold value TH can be determined as a value corresponding to one variation width (voltage) of the gradation in the analog pixel signal PS. By such a setting of the threshold value TH, in the read image data after converted to the digital data, the fluctuation component is suppressed so that the user can hardly recognize the fluctuation component.

When the read image is represented, for example, by 4096 gradations (16 bits), that is, by particular number of gradations (i.e., more than 8 bits), the variation width may be determined as one gradation of the analog pixel signal PS, similarly to a case where the read image is represented by 256 gradations (i.e., 8 bits). Alternatively, when the read image is represented by 4096 gradations (16 bits), the threshold value TH may be determined as a variation width of the analog pixel signal PS corresponding to one 256th (1/256) of the above-mentioned particular number of gradations. It is because the visual sense limit of the human eyes is approximately one 256th (1/256) step of the gradations. When the threshold value TH is set to the variation width for the gradations, most of the fluctuation component is suppressed by the digital conversion, it becomes possible to suppress the fluctuation component in a black area of the read image due to gamma process from being conspicuous.

When a voltage for one gradation step in converting the analog pixel signal PS to the 256-gradation pixel data PD in the AD converter 60 is 5.88 mV, the threshold value TH may be set to a value corresponding to 5.88 mV.

Figure 9:
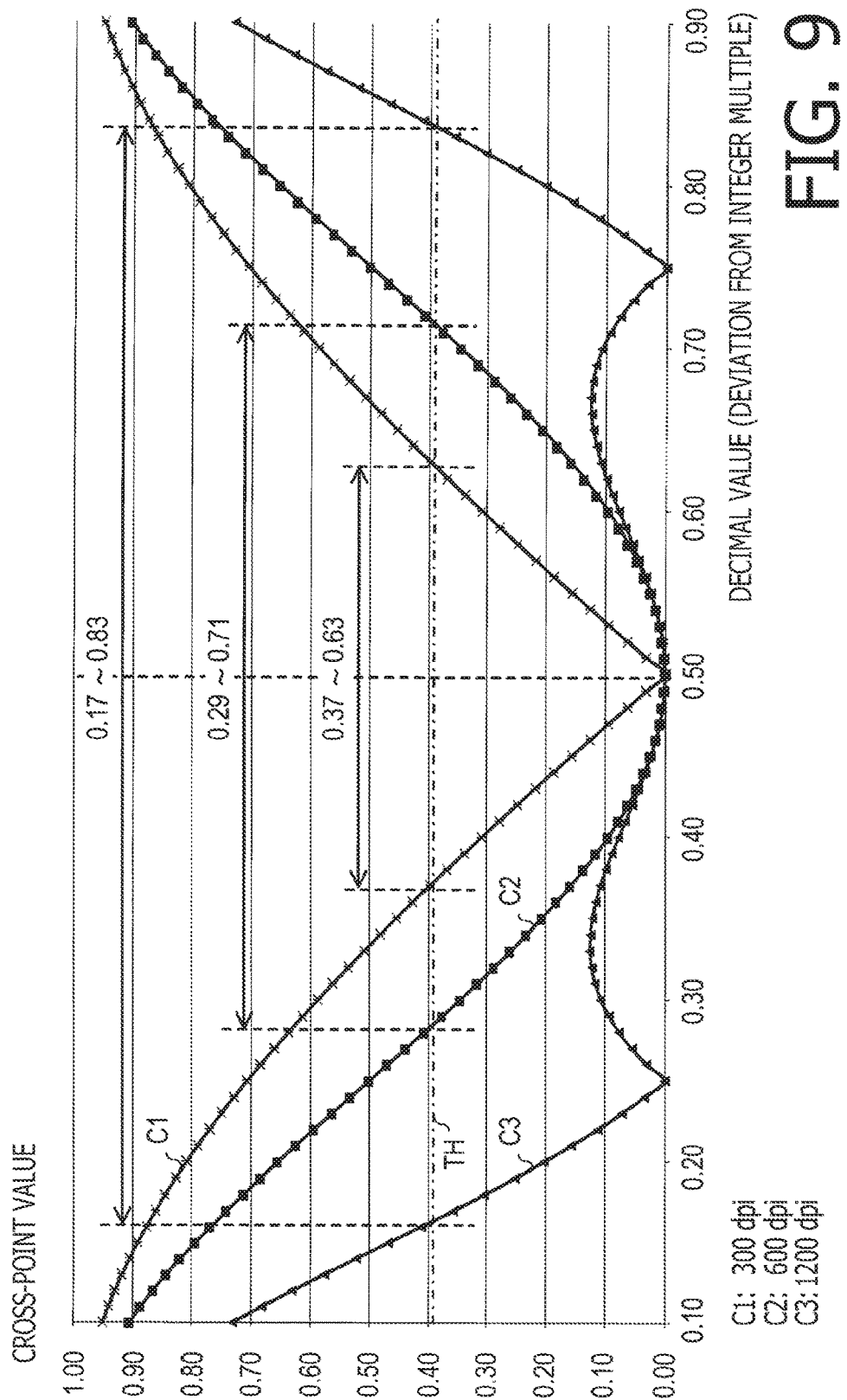
FIG. 9 is a graph showing changes of cross-point values.

FIG. 9 is a graph showing change of the cross-point values when the line period is set to (N+D), where N is an integer greater than zero, and D is a decimal value (a value less than one and greater than zero). In FIG. 9, the horizontal axis represents the decimal value D, and the vertical axis represent the cross-point value. It is noted that, in the graph shown in FIG. 9, the cross-point value is indicated as a standardized value with the amplitude of the fluctuation component being standardized to one. When the amplitude of the fluctuation component is 15 mV, and the voltage for one gradation step is 5.88 mV, the threshold value TH is calculated as 5.88/15=0.39.

A curve C1 shows a cross-point value Zx corresponding to the reading resolution, in the sub scanning direction, of 300 dpi. The curve C1 corresponds to a curve formed by plotting the cross-point values Zx when the phase difference between the first adjacent line and the second adjacent line, that is, a deviation δ of the line period with respect to the integer multiple of the modulation period Tm is changed. The number of pixels corresponding to the modulation period Tm corresponds to a length on the X axis corresponding to the modulation period Tm. The number of the pixels corresponding to the modulation period Tm can be calculated by dividing the modulation period Tm by a pixel period (i.e., modulation period Tm/pixel period). The pixel period corresponding to the period of the pixel clock signal described above.

A curve C2 shows a cross-point Zx corresponding to the reading resolution, in the sub scanning direction, of 600 dpi. Given that a first adjacent line and a second adjacent line are lines adjacent to each other in the auxiliary direction at the reading resolution of 600 dpi, the curve C2 is formed by plotting the values Z (absolute values) of the fluctuation component at the cross points when the fluctuation component, of the first adjacent line, converted to that for the reading resolution in the sub scanning direction of 300 dpi, and the fluctuation component, of the second adjacent line, converted to that for the reading resolution in the sub scanning direction is 300 dpi are superimposed such that the coordinate axes thereof in the main scanning direction are coincident for respective decimal values D. Hereinafter, the fluctuation component converted to that of a line of which reading resolution, in the sub scanning direction, is 300 dpi will be referred to as a fluctuation component of a 300 dpi equivalent line.

A curve C3 shows a cross-point Zx corresponding to the reading resolution, in the sub scanning direction, of 1200 dpi. Given that a first adjacent line and a second adjacent line are lines adjacent to each other in the auxiliary direction at the reading resolution of 1200 dpi, the curve C3 is formed by plotting the values Z (absolute values) of the fluctuation component at the cross points for respective decimal values D when the fluctuation component of the 300 dpi equivalent first adjacent line and the fluctuation component of the 300 dpi equivalent second adjacent line are superimposed such that the coordinate axes thereof in the main scanning direction are coincident.

It is noted that conversion of the fluctuation component of the first adjacent line when the reading resolution in the sub scanning direction is integer (M) multiple of 300 dpi to the fluctuation component of a 300 dpi equivalent line is to convert the fluctuation component of the first adjacent line to an averaged fluctuation component by averaging the fluctuation components of M lines around the first adjacent line including the first adjacent line. Similarly, conversion of the fluctuation component of the second adjacent line when the reading resolution in the sub scanning direction is integer (M) multiple of 300 dpi to fluctuation component of the 300 dpi equivalent line is to convert the fluctuation component of the second adjacent line to an averaged fluctuation component by averaging the fluctuation components of M lines around the second adjacent line including the second adjacent line. It is noted that the integer M is greater than one, and the fluctuation component of the 300 dpi equivalent line when M=1 corresponds to the fluctuation component of a single line which is not averaged.

Figure 10:
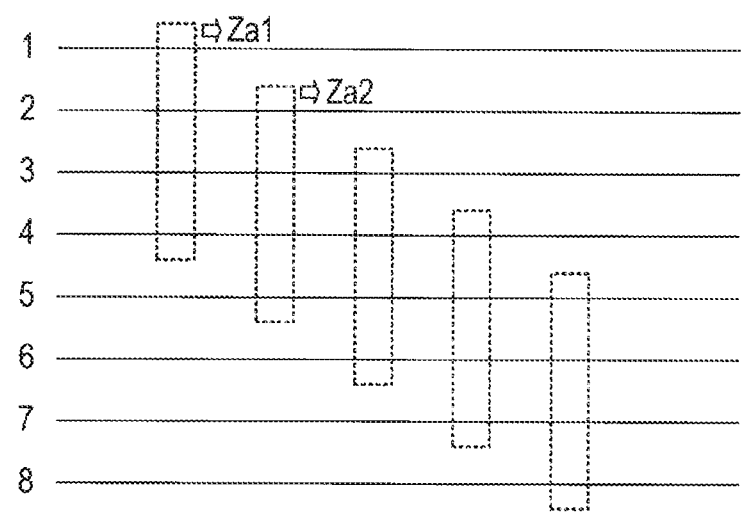
FIG. 10 illustrates a conversion method of converting the fluctuation component to a fluctuation component of a 300 dpi equivalent line.
Figure 11:
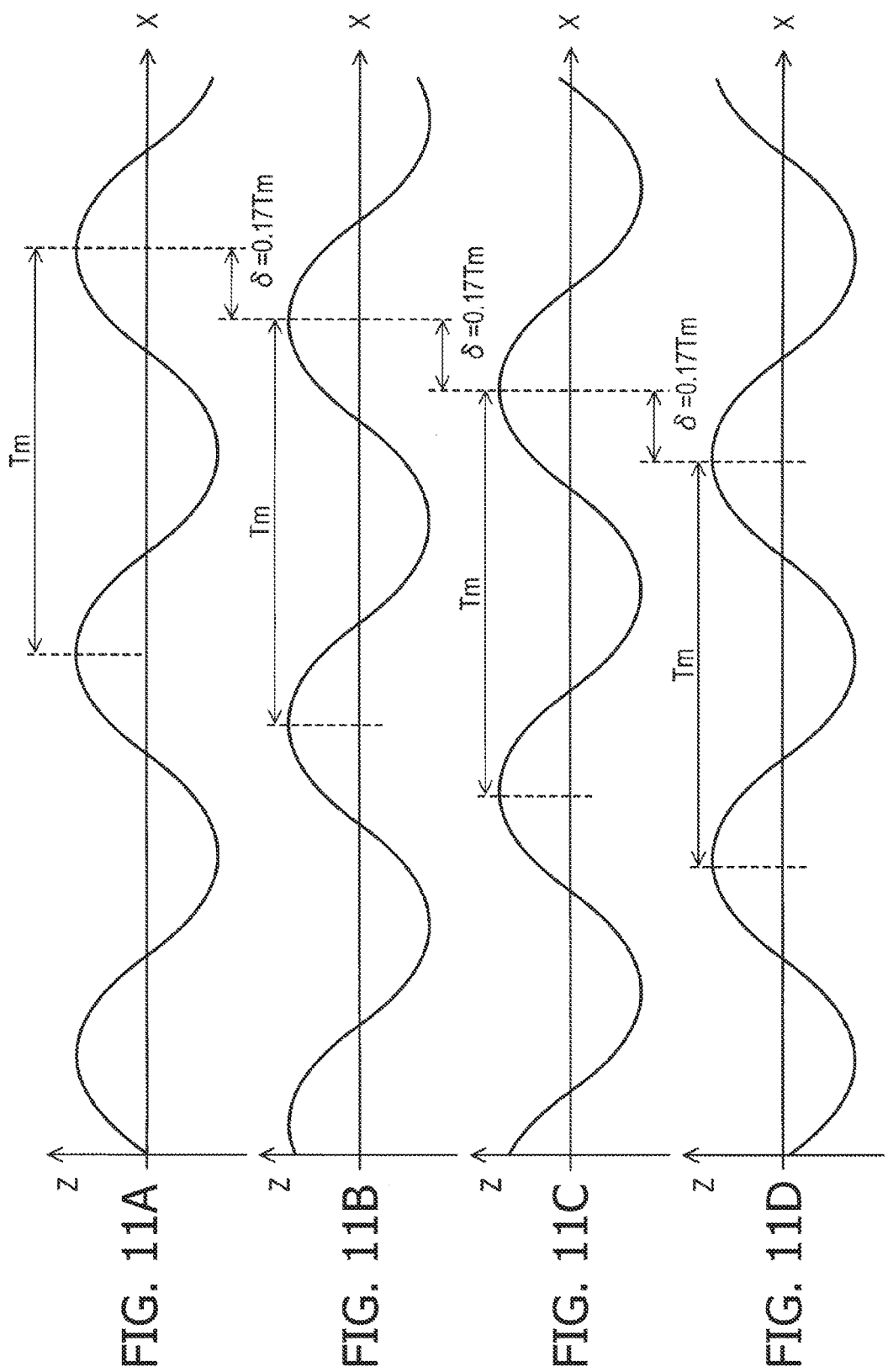
FIGS. 11A-11D show fluctuation components of four lines which are averaged when converted into a fluctuation component of a 300 dpi equivalent line.

According to the illustrative embodiment, converting the fluctuation component of the first line of which reading resolution in the sub scanning direction is 1200 dpi to a fluctuation component of the 300 dpi equivalent line corresponds to, as shown in FIG. 10, conversion of the fluctuation components of first to fourth lines to an averaged fluctuation component Za1. For example, as shown in FIGS. 11A-11D, referring to the deviation δ with respect to the integer multiple of the modulation period Tm, an amount corresponding to the deviation δ, and an average value of the fluctuation components of the first through fourth lines of which phases are shifted by respective lines can be calculated for respective positional coordinates X, thereby the fluctuation component of the first line being converged to the fluctuation component of the 300 dpi equivalent line.

Similarly, conversion of the fluctuation component of the second line to a fluctuation component of the 300 dpi equivalent line corresponds to conversion of the fluctuation components of second to fifth lines to an averaged fluctuation component Za2. That is, an example of converting the fluctuation component of an i-th line, of which reading resolution in the sub scanning direction is an integer multiple of 300 dpi, to the fluctuation component of the 300 dpi equivalent line is converting the fluctuation components of the i-th line through (i+M−1)-th line to the averaged value.

When the line period is a non-integer multiple of the modulation period Tm and the phases of the fluctuation components are shifted among adjacent lines, the fluctuation component of the 300 dpi equivalent line has a smaller amplitude with respect to the fluctuation component before conversion, although the modulating period Tm is unchanged. Therefore, the cross-point value Zx of the fluctuation component of the 300 dpi equivalent line exhibits a tendency that the cross-point value Zx is smaller as the reading resolution in the sub scanning direction is higher.

Such a tendency can be understood from FIG. 9. According to FIG. 9, when the reading resolution in the sub scanning direction is 300 dpi, a range of the decimal value D when the cross-point value Zx is less than the threshold value TH=0.39 corresponding to one gradation step is between 0.37 and 0.63. When the reading resolution in the sub scanning direction is 600 dpi, a range of the decimal value D when the cross-point value Zx is less than the threshold value TH=0.39 is between 0.29 and 0.71. When the reading resolution in the sub scanning direction is 1200 dpi, a range of the decimal value D when the cross-point value Zx is less than the threshold value TH=0.39 is between 0.17 and 0.83.

When the line period is set to (N+D) times the modulation period while the fluctuation components due to the frequency modulation does not exert influence on the image quality, the limitation of the decimal value D is looser as the reading resolution is higher. According to the illustrative embodiment, in accordance with the above analysis, each reading resolution is set to be a minimal period among periods calculated by multiplying (integer N+decimal value D) to the modulation period, the decimal value D corresponding to the cross-point values Zx less than the threshold value TH. As the table mentioned above, one indicating the line periods of respective reading resolutions defined above is stored in the ROM 33.

Figure 12:
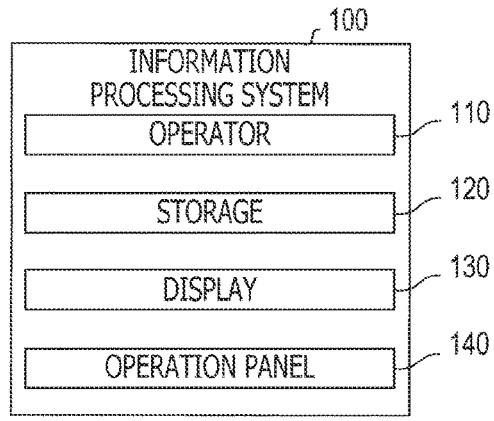
FIG. 12 is a block diagram showing a configuration of an information processing system according to the illustrative embodiment.

The line period for each reading resolution stored in the ROM 33 can be determined, for example, with used of an information processing system 100 which is different from the image scanner 1. The information processing system 100 shown in FIG. 12 includes an operator 110, a storage 120, a display 130 and an operation panel 140. The operator 110 includes a CPU, a ROM and a RAM, and is configured to execute operating processes in accordance with programs. The storage 120 includes an HDD or an SSD, and stored the programs therein. The display 130 is configured to display various pieces of information for the user under control of the operator 110. The operation panel 140 has an input device such as, for example, a keyboard and/or a pointing device, through which user's operation are input to the operator 110.

Figure 13:
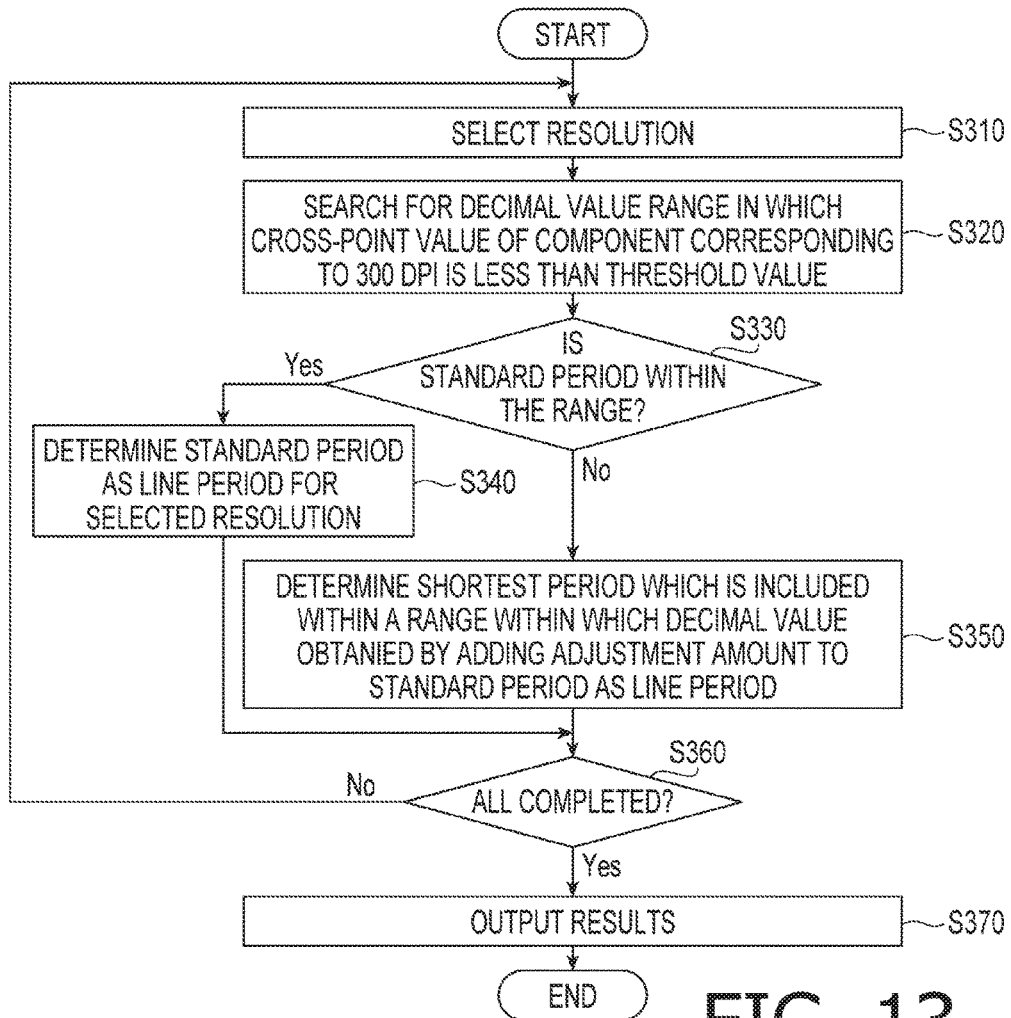
FIG. 13 is a flowchart is a process executed by operator of the image processing system.

When an operation command to calculate the line period is input through the operation panel 140, the operator 110 executes a line period operating process shown in FIG. 13 in accordance with a program stored in the storage 120. When the line period operating process is started, the operator 110 selects one of the reading resolutions which can be set to the image scanner 1 (S310). Information regarding the reading resolution that can be set to the image scanner 1 may be stored in the storage 120.

Thereafter, the operator 110 searches for a range of the decimal value D corresponding to the cross-point values Zx less than the threshold value TH in relation to the selected reading resolution (S320). Such a search of the range of the decimal value D may be executed by simulation. That is, by retrieving information regarding the modulation frequency or the modulation period, and information regarding the threshold value TH which are set in advance from the storage 120, and based on the retrieved information, the range of the decimal value D can be determined. It is noted that, instead of the simulation above, the operator 110 may search for the range of the decimal value D corresponding to the cross-point values Zx less than the threshold value TH by analyzing actual read image data generated by the image scanner 1.

Next, the operator 110 retrieves a standard line period corresponding to the reading resolution selected in S310, and determines whether the remainder (i.e., a decimal value portion) when the standard line period is divided by the modulation period is within the range of the decimal value D corresponding to the cross-point values Zx less than the threshold value TH (S330). By the above determination, the operator 110 determines whether the standard line period satisfies a condition regarding the decimal value D.

The standard line period is an optimal line period for the reading resolution when suppression of the fluctuation component by adjusting the line period is not considered. In other words, the standard line period may be regarded as the line period before adjustment to suppress the fluctuation component is made. The line period corresponds to a time period necessary for the shift registers 15A, 15B and 15C to transmit the analog pixel signals PS for one line to the AD converter 60, and for the AD converter 60 to convert the analog pixel signals PS for one line to digital pixel data PD. The analog pixel signals PS for one line is the analog pixel signals PS for a particular number of pixels, which constitute one line corresponding to the reading resolution in the main scanning direction.

When it is determined that the standard line period satisfies the condition regarding the decimal value D (S330: YES), the operator 110 determines the standard line period as the line period corresponding to the reading resolution selected in S310 (S340).

When it is determined that the standard line period does not satisfy the condition regarding the decimal value D (S330: NO), the operator 110 determines the shortest one of line periods, each of which is calculated by adding an adjustment amount to the standard line period, and satisfies a condition that the remainder (i.e., the decimal value portion) when the line period calculate by adding an adjustment amount to the standard line period is divided by the modulation period is within the range of the decimal value D corresponding to the cross-point values Zx less than the threshold value TH as the line period corresponding to the reading resolution selected in S310 (S350).

The shortest line period determined in S350 is longer than the standard line period, and (integer N+decimal value D) times the modulation period using the minimal decimal value within the ranged of the decimal value D corresponding to the cross-point values Zx less than the threshold value TH. According to the illustrative embodiment, the center of the decimal value D corresponding to the cross-point values Zx less than the threshold value TH is 0.5. Therefore, an absolute value of a difference from 0.5 becomes maximum at both ends of the range of the decimal value D.

After execution of S340 or S350, the operator 110 advances the process to S360, and determines whether the line periods have been determined regarding all the reading resolutions which the image scanner 1 is settable. When there remains a reading resolution for which the line period has not yet been determined (S360: NO), the operator returns the process to S310, change the selection of the reading resolution, and executes steps S320 onwards. When it is determined that line periods have been determined for all the settable reading resolutions (S360: YES), the operator 110 advances the process to S370, and outputs the line period for each of the reading resolutions the image scanner 1 is settable, which is determined in S310-S360.

For example, the operator 110 may notify the user of the information regarding the line period for each reading resolution through the display 130. The user of the information processing system 100 could be a designer of the image scanner 1. The user may generate a table defining the line periods for respective reading resolutions, based on the information regarding the line period for each reading resolution as displayed, and store such a table in the ROM 33 of the image scanner 1. It is note that a part of or all of the method of determining the line period corresponding to the reading resolution using the information processing system 100 described above may be manually performed by the user.

In a table shown in FIG. 14, examples 1-3 of the adjustment amounts are indicated. The numbers in the table are indicated on the premise that the reference clock is 127.7 MHz, and a fluctuation frequency of the SSCG clock (i.e., the modulation frequency) is 31.5 KHz.

According to example 1, the SSCG clock is divided by 13, the pixel frequency, which is a frequency of the pixel clock, is set to 9.82 MHz, and the pixel period, which is inversion of the pixel frequency, is set to 102 nanoseconds. The "number of clock per pixel" indicated in the table may be understood as a division ratio of the pixel clock with respect to the SSCG clock.

According to example 2, the SSCG clock is divided by 12, the pixel frequency is set to 10.64 MHz, and the pixel period is set to 94 nanoseconds. According to example 3, the SSCG clock is divided by 14, the pixel frequency is set to 9.12 MHz, and the pixel period is set to 110 nanoseconds.

The "number of pixel clocks per 1 line" indicates the number of pixel clocks for 1 line for each color after adjustment using the adjustment amount has been made. That is, the number of pixel clocks per 1 line corresponds to the number of pixel clocks per ⅓ line period. The "adjustment amount" indicated in the table is the amount to be added to the standard number of pixel clocks to adjust the decimal value D as described above. It is noted that the standard number of pixel clocks is the number of pixel clock for ⅓ line period. The standard numbers of pixel clocks according to the table are 950 clocks for 300 dpi, 1810 clocks for 600 dpi, and 3530 clocks for 1200 dpi.

According to example 1 and when the reading resolution is 300 dpi, the number of pixel clocks per ⅓ line period is adjusted to 974 as the adjustment amount 24 is added to the standard number of pixel clocks 950. As a result, the line period is adjusted to 0.29746 milliseconds=3×974 clocks× (13/127.7 MHz). The line period is 9.37008 times the modulation period.

According to example 1 and when the resolution is 600 dpi, the standard line period based on the standard number of pixel clocks 1810 satisfies the condition of the decimal value D. Therefore, the adjustment amount to the standard number of pixel clocks 1810 is zero, and the line period is the same as the standard line period, 0.55278 milliseconds=3×1810×(13/127.7 MHz). This line period is 17.41257 times the modulation period.

According to example 1 and when the reading resolution is 1200 dpi, the number of pixel clocks per ⅓ line period is adjusted to 3552 as the adjustment amount 22 is added to the standard number of pixel clocks 3530. As a result, the line period is adjusted to 1.08479 milliseconds=3×3552 clocks× (13/127.7MHz). The line period is 34.17096 times the modulation period.

According to example 2 and when the resolution is 300 dpi or 1200 dpi, the standard line period based on the standard number of pixel clocks satisfies the condition of the decimal value D. When the reading resolution is 600 dpi, the line period is adjusted to 16.29514 times the modulation period.

According to example 3 and when the resolution is 1200 dpi, the standard line period based on the standard number of pixel clocks satisfies the condition of the decimal value D. When the reading resolution is 300 dpi, the line period is adjusted to 10.37058 times the modulation period, and when the reading resolution is 600 dpi, the line period is adjusted to 19.29073 times the modulation period.

The image scanner 1 and the method of determining the line period according to the aspects of the present disclosures have been described in detail. According to the illustrative embodiment, by determining the line period to be (integer N+decimal value D) times the modulation period Tm, influence of the fluctuation component generated in the analog pixel signal PS due to the SSCG clock on the image quality is suppressed. In particular, the line periods are determined, for respective reading resolutions, to be necessary and sufficient periods to suppress the above influence with taking the visual sense limit of human eyes into consideration.

According to the illustrative embodiment, when the reading resolution is 300 dpi or greater, since one pixel is recognized with being combined with the surrounding pixels, the range of the decimal value D corresponding to the cross-point values Zx is less than the threshold value TH when the fluctuation component is converted to the fluctuation component of the 300 dpi equivalent line as an effective range of the decimal value D, and the line period is determined to be (integer N+decimal value D) times the line period so that the line period is shortened within the range.

Therefore, according to the illustrative embodiment, the original Q can be read at a necessary and sufficient line period with suppressing the deterioration of the image quality due to the fluctuation component, for each reading resolution.

As shown in FIG. 9, the range of the decimal value D corresponding to the cross-point values less than the threshold value TH is wider as the reading resolution is higher. Therefore, according to the illustrative embodiment, a shorter line period can be set at a higher reading resolution, and reading of the original can be executed efficiently in comparison with a conventional art in which a line period is set to be the integral multiple of the modulation period and half the modulation period regardless of the reading resolution.

According to the illustrative embodiment, the threshold value TH is set to be a value corresponding to one gradation step of 8-bit read image. Therefore, in the digital read image data, influence of the fluctuation component is sufficiently suppressed, thereby deterioration of image quality being suppressed sufficiently.

According to the illustrative embodiment, the standard line period corresponding to a time period necessary to input the analog pixel signal PS for one line to the AD converter 60, and to convert the input analog pixel signal to digital pixel data is (integer N+decimal value D) times the modulation period, and when a condition regarding the decimal value D is satisfied, the line period for the corresponding reading resolution is determined without changing the standard line period (S340). Further, when the standard line period is (integer N+decimal value D) times the modulation period and the decimal value D does not satisfy the condition, the standard line period is adjusted to a line period based on the minimal decimal value D that satisfies the condition so that the line period after adjustment can be as short as possible (S350). Therefore, according to the illustrative embodiment, the read image data at high quality can be generated efficiently.

It is noted that, when the decimal value D above is slightly greater than the decimal value D which satisfies the condition, it is possible to adjust the standard line period in a shorter direction and (integer N+decimal value D) times the modulation period. In such a case, the standard line period includes tolerance allowing subtraction, and the line period can be determined using the maximum value of the range of the decimal value D satisfying the condition.

It is noted that the aspects of the present disclosure should not be limited to the above-described illustrative embodiment, but various modification of the illustrative embodiment should also be included in the aspects of the present disclosures. For example, the technique described above can be applied to an image scanner configured to perform monochromatic reading as well as ones configured to perform color reading.

The reading resolutions need not be limited to the above-describe exemplary values of 300 dpi, 600 dpi and 1200 dpi. Further, according to the illustrative, the reading resolution in the main scanning direction and the reading resolution in the sub scanning direction are the same. The aspects of the disclosures need not be limited to such a configuration, and the reading resolutions in the main and sub scanning direction may be different from each other. In such a case, the range of the decimal value D is searched based on the reading resolution in the sub scanning direction.

It is noted that a function that a single element has in the illustrative embodiment may be shared by a plurality of elements. Further, a plurality of elements which realize a signal function in the illustrative embodiment may be integrated to less number of or one element. A part of the configuration of the illustrative embodiment may be omitted. At least a part of the configuration of the illustrative embodiment may be added to or replaced with another part of the configuration of the illustrative embodiment. Although not explicitly described, all the aspects of configurations identified by or derived from the claims are regarded to be embodiments.

The SSCG 50 is an example of an operation clock generator, and the liner sensor 10 is an example of a photoelectric converter. The image processor 65 is an example of a data generator. Step S120 executed by the main controller 30 is an example of a process executed by resolution setter, and step S140 executed by the main controller 30 is an example of a process executed by a line period determiner. Step S320 executed by the operator 110 of the information processing system 100 is an example of a process of identifying a decimal value corresponding to the cross-point values less than the threshold value, and steps S330-S350 executed by the operator 110 correspond to an example of a process of determining the line period for each reading resolution. The adjustment amount corresponds to an example of a compensation amount. The SSCG clock is an example of the operation clock.

What is claimed is:

1. An image scanner, comprising:
an operation clock generator configured to generate an operation clock by frequency modulating a reference clock with a particular modulation frequency;
a photoelectric converter having a plurality of photodetectors arranged in a main scanning direction, the plurality of photodetectors receiving reflected light, the reflected light being reflected by an original and is displaced in a sub scanning direction, the sub scanning direction being perpendicular to the main scanning direction, at every line period, the plurality of photodetectors serially outputting analog pixel signals corresponding to received light amounts of the plurality of photodetectors, respectively, in accordance with the operation clock;
an AD converter configured to convert the analog pixel signals serially output by the photoelectric converter to digital pixel data by sampling the analog pixel signals in accordance with the operation clock;
a data generator configured to generate read image data representing an read image of the original based on the pixel data converted by the AD converter;
a resolution setter configured to set a reading resolution in the sub scanning direction; and
a line period determiner configured to determine the line period to be (integer+decimal value) times a modulation period, the modulation period being inversion of the modulation frequency based on the reading resolution set by the resolution setter,
wherein the integer is at least one, and
wherein the decimal value is less than one and more than zero, and is determined based on the reading resolution.

2. The image scanner according to claim 1,
wherein the line period determiner is configured to determine the line period by selecting one of a plurality of periods in accordance with the reading resolution set by the resolution setter,
wherein the plurality of periods are determined, in advance, for reading resolutions, in the sub scanning direction, which the resolution setter is capable of select, respectively, and
wherein fluctuation components due to the frequency modulation and respectively included in the analog pixel signals of a first adjacent line and a second adjacent line corresponding to the reading resolution and adjacent to each other in the sub scanning direction are converted to the fluctuation components of a 300 dpi equivalent first adjacent line and a 300 dpi equivalent second adjacent line, each of the plurality of periods being defined as (integer+decimal value) times the modulation period determined, in advance, so that amounts of the fluctuation component at cross-points of the fluctuation components of the 300 dpi equivalent first adjacent line and the 300 dpi equivalent second adjacent line, when superimposed such that coordinate axes thereof in the main scanning direction are coincident to each other, are less than a threshold value.

3. The image scanner according to claim 2,
wherein the reading resolution set by the resolution setter is equal to or greater than 300 dpi and an integral multiple of 300 dpi,
wherein the fluctuation component regarding the 300 dpi equivalent first adjacent line is an average of fluctuation components of the number of the integer of adjacent lines in the auxiliary direction including the first adjacent line, and
wherein the fluctuation component regarding the 300 dpi equivalent second adjacent line is an average of fluctuation components of the number of the integer of adjacent lines in the auxiliary direction including the second adjacent line.

4. The image scanner according to claim 2,
wherein the AD converter is configured to convert the analog pixel signals to pixel data of particular gradation steps equal to or greater than 8 bits, and wherein each of the plurality of periods is (integer+decimal value) times the modulation period, the modulation period being defined, in advance, such that an amount of the fluctuation component at the cross-point is less than a deviation of the analog pixel signal corresponding to one gradation step or one 256th of the particular gradation steps.

5. A line period determining method for an image scanner having an operation clock generator configured to generate an operation clock by frequency modulating a reference clock with a particular modulation frequency, a photoelectric converter having a plurality of photodetectors arranged in a main scanning direction, the plurality of photodetectors receiving reflected light, the reflecting light being reflected by an original and is displaced in a sub scanning direction perpendicular to the main scanning direction, at every line period, the plurality of photodetectors serially outputting analog pixel signals corresponding to received light amounts of the plurality of photodetectors, respectively, in accordance with the operation clock, an AD converter configured to convert the analog pixel signals serially output by the photoelectric converter to digital pixel data by sampling the analog pixel signals in accordance with the operation clock, read image data representing an read image of the original being generated based on the pixel data converted by the AD converter, the method comprising:
determining a line period which is (integer+decimal value) times a modulation period that is inversion of the modulation frequency for each of reading resolutions settable in the image scanner, the integer being greater than one; and
identifying, for each of settable reading resolutions, at least one decimal value making cross-point values less than a threshold value, the cross-point values being amounts of the fluctuation component at cross-points of the fluctuation components of the visual sense limit resolution equivalent first adjacent line and the visual sense limit resolution equivalent second adjacent line superimposed such that coordinate axes thereof in the main scanning direction are coincident to each other, wherein the determining includes setting, for each of the settable reading resolutions, the line period corresponding to the reading resolution to (integer+decimal value) times the modulation period determined based on the identified decimal value.

6. The method according to claim 5, wherein the cross-point values are amounts of the fluctuation components at cross-points thereof after the fluctuation components due to the frequency modulation and respectively included in the analog pixel signals of the first adjacent line and the second adjacent line are converted to the fluctuation components of a 300 dpi equivalent first adjacent line and a 300 dpi equivalent second adjacent line, and then superimposed such that coordinate axes thereof in the main scanning direction are coincident to each other.

7. The image scanner according to claim 5, wherein the AD converter is configured to convert the analog pixel signals to pixel data of particular gradation steps equal to or greater than 8 bits, and wherein the threshold value corresponds to a deviation of the analog pixel signal corresponding to one gradation step or one 256th of the particular gradation steps.

8. The method according to claim 5, wherein the settable reading resolution in the image scanner is an integral multiple of 300 dpi, the integral multiple being one or greater, wherein the fluctuation component corresponding to a visual sense limit reading resolution in the sub scanning direction is the fluctuation component corresponding to the reading resolution of 300 dpi in the sub scanning direction, wherein the fluctuation component regarding the 300 dpi equivalent first adjacent line is an average of fluctuation components of the number of the integer of adjacent lines in the auxiliary direction including the first adjacent line, and wherein the fluctuation component regarding the 300 dpi equivalent second adjacent line is an average of fluctuation components of the number of the integer of adjacent lines in the auxiliary direction including the second adjacent line.

9. The method according to claim 5, wherein the identifying identifies, for each of the settable reading resolutions, a range of the decimal value making the cross-point values less than the threshold value, and wherein the determining determines, for each of the settable rad resolutions, the (integer+decimal value) times the modulation period as the line period corresponding to the reading resolution using one of the minimal decimal value within the identified range, and the decimal value of which absolute value of a difference with respect 0.5 within the identified range has a maximum value.

10. The method according to claim 9, wherein the determining determines, for each of the settable reading resolutions, the line period such that:

when a standard line period corresponding to the reading resolution is not (integer+decimal value) times the modulation period that indicates the decimal value within the identified range, the line period using the minimal decimal value is determined as the line period corresponding to the reading resolution by adding a compensation amount to the standard line period; and when the standard line period corresponding to the reading resolution is (integer+decimal value) times the modulation period that indicates the decimal value within the identified range, the standard line period without adding the compensation amount is determined as the line period corresponding to the reading resolution, wherein the standard line period corresponding to the reading resolution is a period based on a time period necessary for the photoelectric converter to serially output the analog pixel signals for a particular number of pixels in the main scanning direction corresponding to the reading resolution.

* * * * *